May 23, 1933.  R. D. SMITH  1,910,450

FLOW GOVERNING APPARATUS

Filed Dec. 29, 1926  3 Sheets-Sheet 1

INVENTOR
Raymond D. Smith

May 23, 1933.  R. D. SMITH  1,910,450
FLOW GOVERNING APPARATUS
Filed Dec. 29, 1926  3 Sheets-Sheet 2
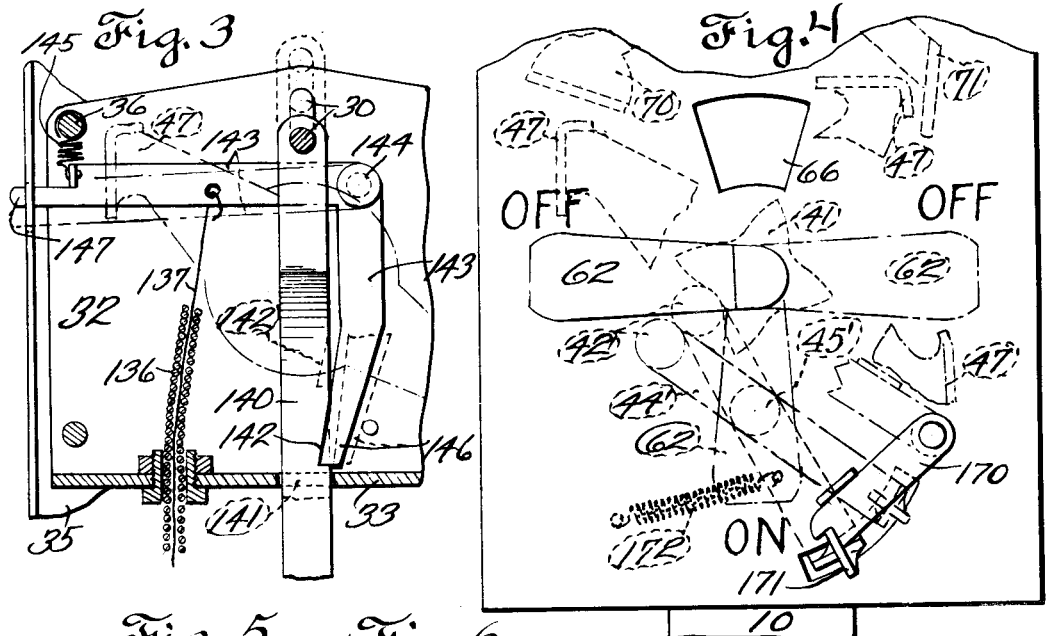
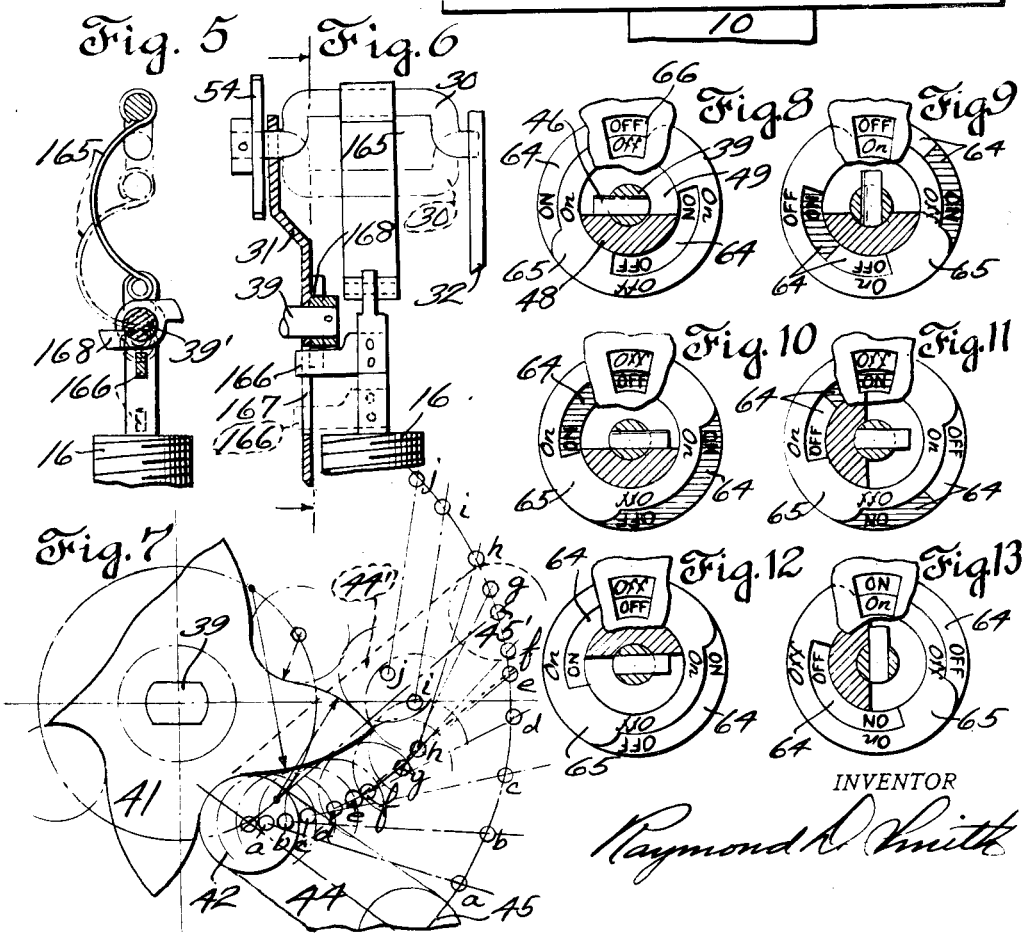
INVENTOR
Raymond D. Smith

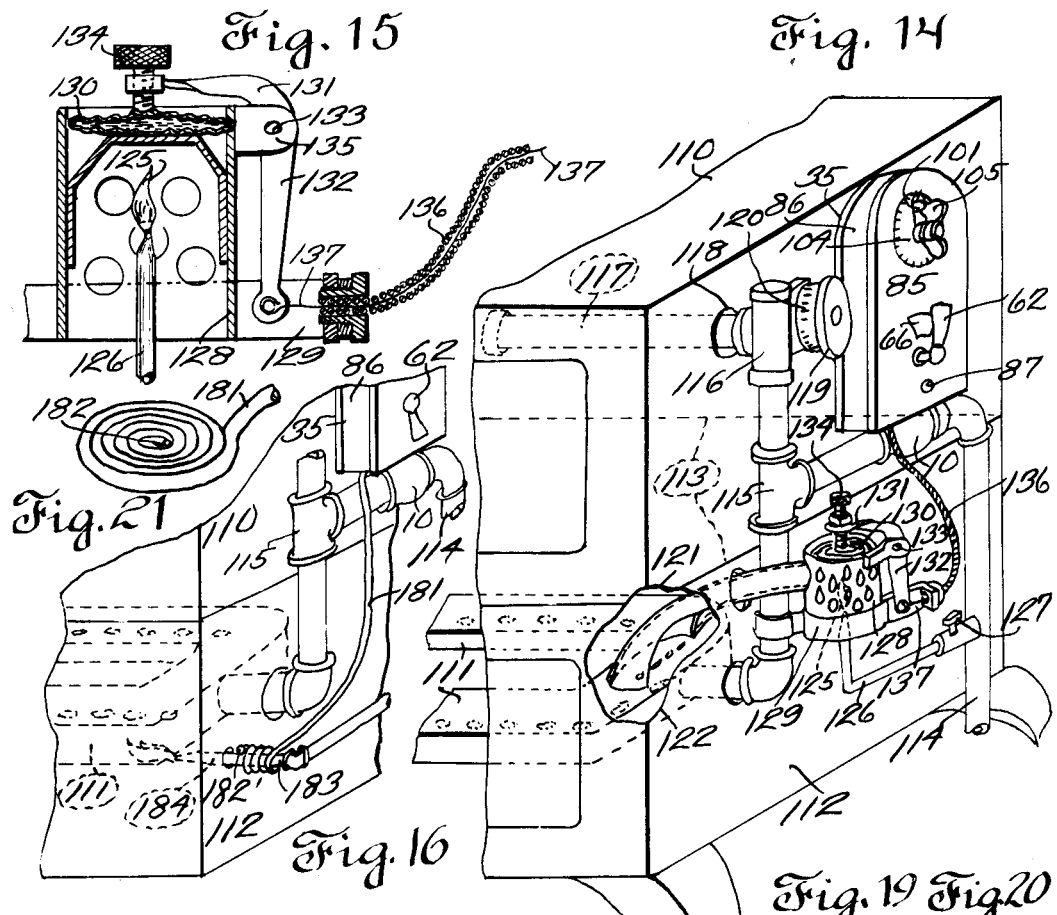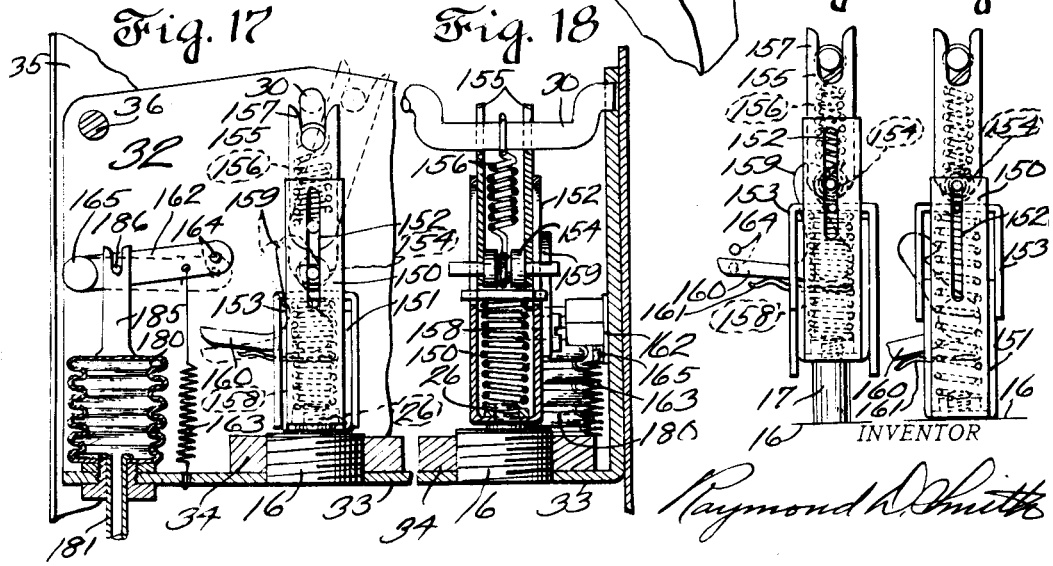

Patented May 23, 1933

1,910,450

UNITED STATES PATENT OFFICE

RAYMOND D. SMITH, OF PLEASANTVILLE, NEW YORK, ASSIGNOR TO TREMONT PRODUCTS CORPORATION, OF BOSTON, MASSACHUSETTS, A CORPORATION OF MASSACHUSETTS

FLOW GOVERNING APPARATUS

Application filed December 29, 1926. Serial No. 157,733.

This invention relates broadly to apparatus for controlling automatically the flow of fluids, gases, electricity or other medium or fuel and specifically relates to apparatus for controlling the flow of a combustible fuel to a burner that may be used for heating air, water or the like or for the cooking of foods or in any process utilizing heat or the medium whose flow is to be controlled.

For the purpose stated my improved apparatus consists of a combination of controls operative preferably upon a common fuel fed to a burner or burners which may or may not be enclosed in or associated with an oven or other restricted space and the invention resides in the normal features of such combination inclusive of certain specific features of the individual controls contributing to their combined and co-operative purpose.

The invention will be fully understood from the following description and the accompanying drawings in which Fig. 1 is a front view with casing partly broken away and showing certain parts in section on the planes 1—1—1—1 in Fig. 2.

Fig. 3 is a partial view in section taken on the plane 3—3 in Fig. 2 looking from the left and showing the safety locking mechanism.

Fig. 4 is a fragmentary front view showing a modification wherein the valve actuating handle is arranged for reciprocative rather than rotary movement.

Figs. 5 and 6 show front and side views, respectively, of an interlocking modification to insure that the last automatic operation of the timer shall act to close the valve.

Fig. 7 shows on an enlarged scale one possible shape of detent wheel and the co-operative action of the detent roller.

Figures 1, 2:
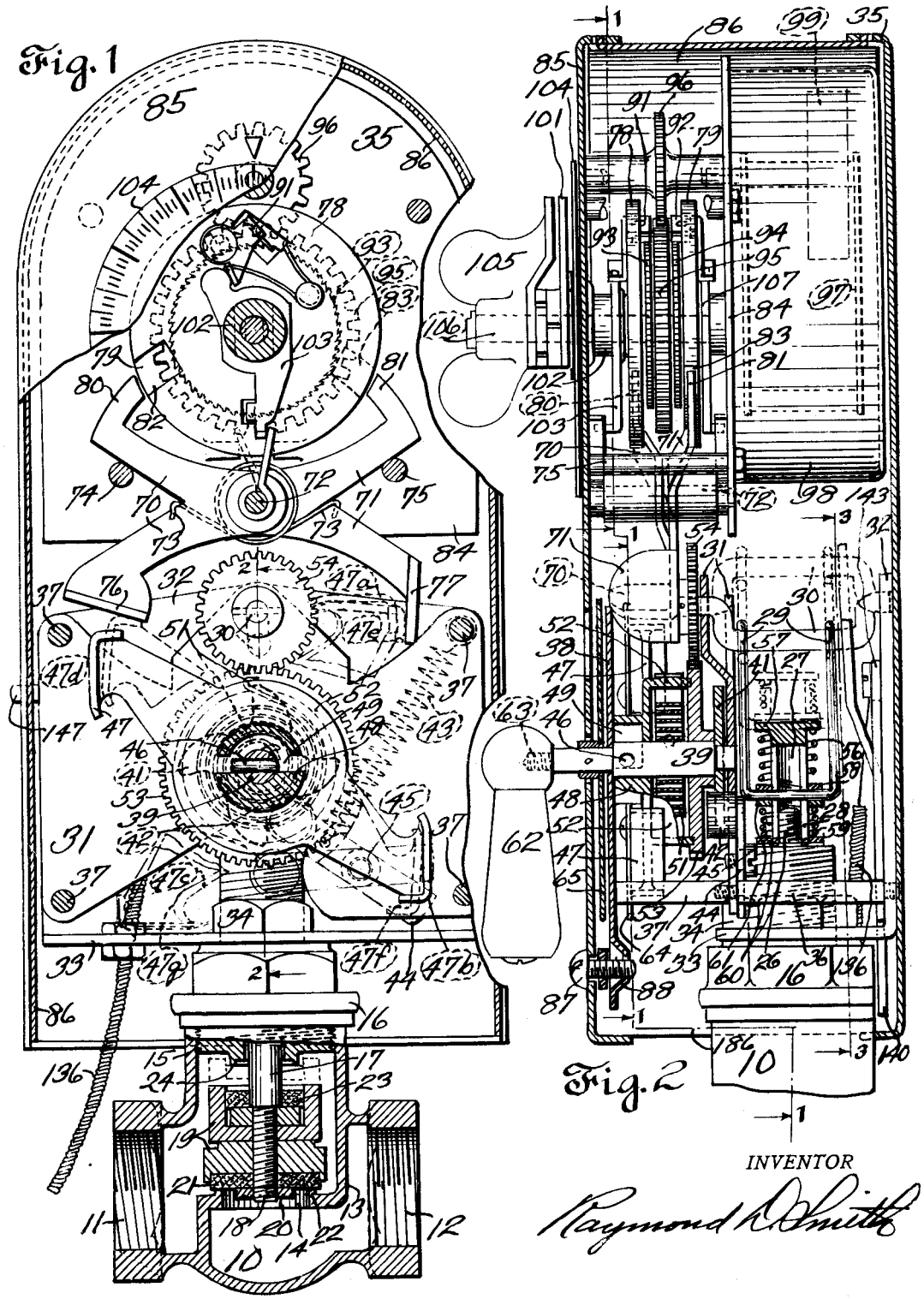
Fig. 2 is a side elevation looking from the right at Fig. 1 certain parts being shown in central section on the plane 2—2 in Fig. 1.

Figs. 8 to 13 inclusive show different positions of indicators corresponding to certain absolute and relative movements of the valve and its operating handle.

Fig. 14 indicates a possible positioning and operative relation of component parts of an oven control system that may include such automatic control devices as are particularly described and claimed in connection with the present disclosure.

Fig. 15 shows in enlarged detail an advantageous arrangement of pilot light and thermostatic mechanism operatively associated therewith for operating the safety mechanism devices of Fig. 3 or Fig. 17.

Fig. 16 shows a different thermo-dynamic device for operatively relating the time controlled valve of this invention to a pilot flame.

Fig. 17 shows a modification wherein the valve will be automatically closed if the pilot flame is extinguished.

Fig. 18 is a side view of the mechanism in Fig. 17 looking from the right.

Fig. 19 shows the position of the parts of Fig. 17 when the valve is opened.

Fig. 20 shows the position of these parts when the valve is closed because the pilot flame is extinguished.

Fig. 21 shows a possible arrangement for rendering the device of Fig. 17 sensitive to heat from the pilot flame.

Throughout the drawings different views of the same part are designated by the same reference numeral.

In Fig. 1 the flow control device to be actuated is shown for purposes of illustration merely as a valve having the body 10 provided with the threaded outlets 11 and 12 separated by the partition 13, in the horizontal portion of which the circular orifice 14 provides the only passage from outlet 12 to outlet 11 or vice versa. Piping connection, not shown, to outlets 11 and 12 may if desired constitute the sole support and mounting means for the entire control mechanism hereinafter to be described.

Valve body 10 has internal threads at 15 to receive the gas tight cap 16 which guides the vertically slidable valve stem 17 threaded at its lower extremity 18 and there at carrying a washer seating structure 19 retained against a shoulder on the valve stem by a nut 20 at the extremity of the stem. Lower washer 21 is shown seated against the lip 22 at the rim of orifice 14 to close the latter and upper washer 23, when valve stem 17 is raised, will be brought against lips 24 to seal the vertical outlet in cap 16 through which stem 17 extends thereby doing away with the necessity of any gas or fluid tight packing about said stem and permitting the latter to be mechanically free for sliding up and down to open and close orifice 14 respectively.

The upper end of valve stem 17 is shown at 26 in Fig. 2 and is threaded for securing thereto a spring post 27 vertically slotted at 28 to receive and permit sliding movement of a connecting rod member 29 hinged upon crank 30 having a forward bearing in frame plate 31 and a rear bearing in frame plate 32, the latter of which has a forwardly extending horizontal portion 33 clamped against valve cap 16 by the retaining nut 34 and thereby acting as a rigid support for the back cover 35 of the housing which may be secured to or integral with frame plate 32.

Frame plate 31 is spaced from and secured to plate 32 by four studs 36 and four similar studs 37 act as extensions of studs 36 and carry a frontmost plate 38 between which and plate 31 is journaled the main actuating shaft 39 fixedly carrying on a squared portion thereof the detent wheel 41 into engagement with which roller 42 is constantly pressed by spring 43 acting on lever 44 pivoted at 45 and carrying roller 42 at its extremity.

Between detent wheel 41 and front plate 38 a spring connected, unitary structure is freely rotatable on shaft 39 within limits of relative movement determined by a pin 46 in the shaft. This structure comprises a double-ended stop arm 47 having a forward hub 48 one half of which is recessed at 49 to permit the turning of pin 46 and the other half of which abuts against pin 46 permitting in this particular example a half circle of relative movement between shaft 39 and stop arms 47.

A spiral band spring 51 engages at its outer end and is housed by a hollow drum portion 52 extending rearwardly from arms 47 and is anchored at its inner end to a projection on shaft 39 thus acting normally to hold stop arms 47 in the rotative relation to shaft 39 and its fixed detent wheel 41 determined by abutment of hub 48 against pin 46 as shown in Fig. 1.

Only the stop arms 47 have direct operating connection with the valve actuating crank 30 and this is effected by a large gear 53 fast to and closing the rear of drum 52 and providing a rear bearing for the stop arm structure upon shaft 39. Gear 53 is in mesh with a smaller gear 54 pinned to the forward end of crank 30 and which may have any desired ratio to gear 53, it being noted that if gear 54 be exactly half the size of gear 53 that quarter turns of stop arms 47 will produce half turns respectively of crank 30 and the particular mechanism here shown is so designed to operate.

The up and down motion of crank 29 is transmitted to valve stem 17 through the medium of two compression springs, the upper spring 56 acting between the enlarged head 57 of spring post 27 and a washer 58 freely slidable on the latter. In like fashion lower spring 59 is retained between a washer 60 that may be clamped against a shoulder on stem 17 by spring post 27 and another washer 61 freely slidable on spring post 27 as is washer 58. It is thus designed that the seating of washer 21 against lip 22 shall be accomplished through the compression of spring 59 and that the seating of valve washer 23 against the lip 24 shall be accomplished by compression of spring 56 to which ends the up and down travel of crank 29 should exceed the up and down travel of the valve stem 17 at each half revolution of the crank 30.

I may provide a conventional handle such as is commonly used to operate gas valves as shown at 62 and I preferably arrange such handle to be readily removable from the end of shaft 39 by screwing handle 62 onto a threaded terminal 63 of the shaft as this handle must come off and be replaced for purposes of separating the time control mechanism hereinafter to be described from the above described valve actuating mechanism.

I may employ any suitable form of indicator 64 to turn fixedly with stop arms 47 and any other suitable indicator 65 to turn fixedly with shaft 39 for purposes hereinafter described in detail.

In the absence of any mechanism additional to that already described it will be seen that complete means are at hand for the operation of the valve by means of handle 62 which latter is normally caused to assume some one of four definite positions represented by positions 47, 47A, 47B, or 47C of the stop arm 47 in Fig. 1 as, under these circumstances the arms 47 turn in unison with handle 62 which latter is constantly urged to some one of the said positions by seating of roller 42 in the crotch portions of the detent wheel 41 under impulse of spring 43, the shape of the detent wheel 41 being such in the present illustration as to permit only uni-directional rotation in a clockwise direction, retrogressive movement being prevented by the fact that the roller 42 and its lever 44 act as a pawl with reference to wheel 41 as a ratchet. The shape of wheel 41 is further such that any movement of same tending to dislodge roller 42 from its normally seated position is strongly opposed by the action of spring 43 which will accomplish the necessary rotative positioning of wheel 41 to accomplish such seating at all times when handle 62 is released by the hands of the operator. Thus turning handle 62 in a clockwise direction is effected against the opposition of spring 43 until the highest point of the detent wheel passes dead center with relation to roller 42 at which time said roller snaps upwardly into its next seating position and a quarter turn of shaft 39 results. This effects a half turn of crank 30 through gears 53 and 54, opening the valve if it has been closed and vice versa at each quarter turn of handle 62. It will be seen that the valve in this arrangement cannot remain in any position other than a fully opened or fully closed position unless deliberately so held by the hand of the operator and to these ends it will be appreciated that spring 51 must have an adequate preponderance of strength over springs 56 and 59.

For putting the valve actuating mechanism above described under control of timing mechanism I may employ a wide range and variety of timing mechanisms which conveniently may act through a detent rocker 70 and a co-axial detent rocker 71 both rockable on the spindle 72 and both urged downwardly by spring 73 to a normal position at rest against posts 74 and 75 respectively and having terminals 76 and 77 respectively positioned in the path of stop arms 47 but displaceable from said path to permit the passing of arms 47 in either direction of rotation by the pressure of arms 47 thereon which is normally adapted to overcome the strength of spring 73 unless rockers 70 and 71 be otherwise locked in place.

For so locking rockers 70 and 71 any suitable time controlled devices may be employed such for instance as two cams 78 and 79 whose peripheries are positioned to block the upper ends 80 of rocker 70 and 81 of rocker 71 at all times except when a notch or recess 82 in cam 78 or 83 in cam 79 are rotated to a position opposite rocker ends 80 and 81 respectively.

Regardless of the specific construction or arrangement of any of the timing mechanism parts so far described they may be parts of an integral structure comprising all of the other parts of timing mechanism to be employed and for convenience of assemblage mounted upon and carried by frame and housing parts adapted to assemble to the back cover 35 of the housing or in fixed relation thereto so that the parts of the timing mechanism such as rockers 70 and 71 which are to co-act with parts of the valve actuating mechanism such as arms 47, shall be properly and accurately related thereto and to this end the cams 78 and 79 and the rockers 70 and 71 have their bearings journaled between a frame plate 84 secured to and spaced from the front cover 85 of the housing by four posts 74 and the side of the housing may consist of a sheet metal band 86 fast to or removable from either the back housing cover 35 or the front housing cover 85 and as a simple means to retain the entire timing mechanism structure in assembled relation to the valve actuating mechanism, I may provide a single screw 87 retained loosely in the front cover 85 and engageable with a threaded depression 88 in the frame plate 38.

For the purposes of explaining this invention it will be necessary to illustrate and describe only a few of the many forms of time giving mechanisms which may be employed to act upon cams 78 and 79 for the purpose of governing rockers 70 and 71 or any control devices which within the scope of this invention may fairly be considered the equivalents thereof.

Specifically in Figs. 1 and 2 I have shown a time giving mechanism having the main features of that disclosed in my co-pending application, Serial No. 675,419, comprising for example pawls 91 and 92 pivoted respectively on cams 78 and 79 and spring urged into engagement respectively with ratchet wheels 93 and 94 turning fixedly with a gear 95 in mesh with a pinion 96 impelled by a time movement 97 of any desired form and time capacity which may be housed within the inner casing 98 and having power spring 99 and a gear train or other retarding device not shown.

A pointer 101 outside the housing is connected by hub 102 and actuator 103 for rotating cam 78 to any desired time setting position which may be measured by a time dial 104 with suitable graduations outside the housing. Another pointer 105 has connection by means of shaft 106 and actuator 107 for turning cam 79 to any desired time setting. Actuators 103 and 107 by lost motion engagement with cams 78 and 79 respectively may act to release the pawls from the ratchet wheels and thereby are capable of adjusting cams 78 and 79 in either direction to the desired time setting and when released leave the cams conditioned to be positively impelled in a counter clockwise direction in Fig. 1 by the ratchet wheels 93 and 94 as driven by the time movement.

The operation of the complete valve and timing mechanism structure above described may be summarized as follows. So long as the time pointers 101 and 105 point upwardly in their zero position, rockers 70 and 71 are freely permitted to yield upwardly by admission into notches 82 and 83 to permit the free passing of arm 47 in either direction of rotation. Successive quarter turns clockwise of handle 62 therefore advance arm 47 to the successive positions indicated at 47a, 47b and 47c. Fig. 8 shows diagrammatically the position of parts corresponding to the full line position of stop arm 47 in Fig. 1; Fig. 13 shows the position corresponding to position 47a; and Fig. 12 shows these parts corresponding to position 47b of the stop arm. The indicator words in Figs. 8, 13 and 12 are seen to be identical on both indicators 64 and 65 except for the style of lettering whereby the operator is instructed that the valve is either open or closed and not under time control to perform any automatic action. If it is desired to set the mechanism to merely turn the valve "off" at a predetermined time, "off" pointer 105, alone, is turned to the right away from its zero position so that cam 79 and the notch 83 therein are positioned so that rocker 71 is locked in its position shown in Fig. 1 by the periphery of cam 79. This displacement of pointer 105 winds the power spring 99 of the time movement a corresponding amount through pin and flip stop engagement not shown so that the running of the movement automatically returns pointer 105 and the cam 79 to their zero position in Fig. 1 in a period of time proportional to their degree of displacement from the zero position and upon return to said position are there arrested and in turn arrest the running of the time movement all in accordance, if desired, with the principles of operation of a similar time giving mechanism pictured and described in by co-pending application, Serial No. 675,419 filed November 17, 1923, now Patent No. 1,869,519, granted Aug. 2, 1932. As will hereafter be described it is immaterial to the broader aspects of the present invention whether this or other types of time giving mechanism be employed to control the movements of arm 47 in the manner to be described.

Rocker 71 is now locked but rocker 70 is still free to yield so that starting with the full line position of parts in Fig. 1 and Fig. 8, the first quarter turn of handle 62 will advance arm 47 to position 47a as usual wherein the associated parts are positioned as in Fig. 13. But upon the next quarter turn of handle 62, arm 47 is permitted to advance only from position 47a to 47e being there intercepted by rocker 71 while handle 62 is caught and held against retrogressive travel by roller 42 acting as a pawl in engagement with detent wheel 41 as a ratchet, power thereby being stored in the band spring 51 and the parts being positioned as in Fig. 11. Upon the release of arm 47 by rocker 71 arm 47 will move from position 47e to the full line position in Fig. 1 whereupon the parts will assume the position in Fig. 12 again free from time control until the pointers 101 or 105 are again displaced from zero. In a corresponding manner by displacing both pointers 101 and 105 from zero and starting with the full line position of arm 47 in Fig. 1 at which time the other parts are positioned as in Fig. 8, the first quarter turn of handle 62 advances arm 47 to position 47d and the other parts to the position in Fig. 9 and a further quarter turn of handle 62 has no effect on arm 47 but positions the parts as in Fig. 10. The valve is now set for two automatic time controlled actions, the first to occur when time movement returns pointer 101 to zero releasing arm 47 for movement from position 47d to position 47e which turns the valve "on", and the second when at a later time "off" pointer 105 is returned to zero which in the manner heretofore described permits the escapement of arm 47 to its full line position to close the valve, the position of parts after the first escapement being that in Fig. 11 and after the second escapement being that in Fig. 12.

The indicator dials 64 and 65 may be like dials numbered 98 and 97 respectively in my co-pending application Serial Number 675,419 except that I here show the dial 65 to be lettered in style to distinguish same as indicating always the ultimate position to which the valve will be automatically actuated under time control, while dial 64 always indicates the true condition of the valve at any given time. The shaded portion of dial 64 helps to show whether or not the valve is under time control in case both words which appear in the indicator window 66 are alike.

A useful application of the valve actuating mechanism heretofore described is pictured in Fig. 14 wherein an oven 110 constitutes an enclosure designed to be heated by a burner 111 that may be located in the oven 110 but in the said figure is located in a lower compartment or sub-oven 112 separated from the superimposed oven 110 by horizontal partition 113. The supply of gas to burner 111 is through the pipe line 114 in which operates the valve 10 designed for manual and time control as hereinbefore described and another automatic or regulating valve 115 operated by any well known heat responsive device represented as having the casing 116 from which the heat sensitive member 117, commonly a thermostat, projects into the heat zone of oven 110 through an opening 118 in wall 121 and associated with which is the heat determining control 119 provided with graduations 120. As constructions and mechanisms are numerous and old in the art for regulating gas valves automatically in a manner to maintain within set limits a constant oven temperature, this picturization of parts 115 to 120 inclusive will be taken as a composite representation of any automatic device sensitive to the heat of oven 110 (or it might if preferred be similarly sensitive to the heat of oven 112) and acting thereby on valve 115 to vary the flow of gas through pipe line 114 to burner 111.

One specific method of operation well understood in the art is that cooling of the heat sensitive member 117 will cause the device to act to increase the flow of gas to burner 111 and heating of member 117 will act to decrease the flow of gas. See for instance Fig. 31 in my co-pending application Serial No. 150,278. In other arrangements if desired the device 116 may merely act to decrease or entirely shut off the flow of gas to burner 111 when oven 110 has attained a predetermined temperature for which the control 119 may be set and not act to again open valve 115 to furnish a supply of gas even if heat sensitive member 117 does cool off.

Additional attachments in Fig. 14 comprise a pilot flame 125 which may be supplied constantly with gas through a small pipe 126, means to regulate the size of the pilot flame or shut same off altogether being afforded by the cock 127. A protective cage 128 shown supported by a bracket 129 partially encompasses the pilot flame 125 and has a hooded member extending from the cage 128 through the wall 122 of compartment 112 and disposed over burner 111 to collect unignited gases arising therefrom and direct them in the presence of free air to a point sufficiently close to pilot flame 125 to be ignited thereby and to flame or flash back thereupon and ignite the main burner 111. The top of cage 128 supports a thermostatic disc or wafer or sylphon 130 or any type of thermostat adapted to press upwardly on the arm 131 of a bell crank lever 132 pivoted at 133 and adjustable in its operating relation to thermostat 130 by means of set screw 134. A bracket 135 serves to anchor one end of a conduit 136 through which a flexible wire 137 extends and is connected to the lower end of bell crank 132 to be pulled by the latter when heating of thermostat 130 presses upwardly on the arm 131. Conduit 136 and wire 137 lead to the valve actuating mechanism of Figs. 1 and 2 for the purpose of operating the safety locking mechanism shown in Fig. 3. Partition 113 is optional and may be omitted.

The parts of the safety locking mechanism comprise a vertical bar 140 pivoted on the crank 30 and guided near its lower end for vertical sliding movement by a slot 141 in the horizontal portion of rear frame plate 32 and has the locking notch 142 in its edge. A bell crank lever 143 pivoted at 144 is urged upwardly by spring 145 so that its lower end 146 tends to engage with notch 142 and when so engaged prevents the raising of bar 140 thereby locking the valve in closed position although it will be seen that the valve may be closed from its open position at any time. A finger 147 projects outside the main casing as a means of depressing lever 143 to release bar 140 at any time. It is the function of wire 137 protected by the conduit 136 to maintain lever 143 in its unlocked position indicated by broken lines in Fig. 3 by transmitting the pull of the thermostatically operated bell crank 132 when pilot flame 125 heats the thermostat 130. Should flame 125 be extinguished, thermostat 130 will cool and spring 145 will operate lever 143 to prevent opening of the valve, this constituting the safety feature that gas cannot be supplied to burner 111 unless pilot flame 125 is burning to ignite said burner.

A different and still more perfect safety feature is provided by the modification shown in Figs. 17 to 20 inclusive wherein should the valve be open, it will be automatically closed by the mere extinguishment of the pilot flame. For the parts 27, 29 etc. forming the operating connection between crank 30 and valve stem 26 in Figs. 1 and 2, is substituted a U-shaped rigid spring nest 150 with enclosing sides 151 extending only approximately half its height and rigidly mounted upon the threaded end of the valve stem and provided with vertical slots 152 serving to guide an inverted U-shaped spring guide 153 and a vertically slidable roller 154 riveted to which are the upright bars 155, the forked ends 157 of which engage with crank 30. An extension spring 156 connects roller 154 with crank 30 so that in the uppermost position of said crank shown in Figs. 19 and 20 the valve washer 23 is seated upwardly against lips 24 by the tension in spring 156 due to the vertical travel of crank 30 exceeding the vertical travel of the valve stem 17 which causes the small separation of crank 30 shown in Figs. 19 and 20 from its fully seated relation at the bottom of fork 157 as at all other times occurs as shown in Figs. 17 and 18. The compression spring 158 always acts downwardly on the valve stem 17 and it is against the resistance of this spring that valve washer 21 is seated downwardly against lips 22 to close the valve and spring 158 is normally held compressed to the degree shown in Figs. 17, 18 and 19 by engagement with roller 154 of a latch finger 159 operated by spring 161 and the trip projection 160. Normally the parts described are moved up and down in fixed relation respectively to open and close the valve as shown in Figs. 17, 18 and 19 when nothing interferes with the up and down travel of tripping projection 160. But should the thermostat cool upon extinguishment of the pilot flame 125 spring 163 is permitted to depress lever 162 into a position so that pin 164 trips the latch finger 159 whereupon spring 158 will be released to move the parts from position in Fig. 19 to their position in Fig. 20 and close the valve even though the crank 30 remains in its uppermost position. However, upon the next succeeding half turn of crank 30 as if to close the valve, finger 159 under impulse of spring 161 will again engage with and hold roller 154 to couple the valve into fixed operating relation to crank 30 as heretofore described. This same tripping of latch finger 159 will occur at each raising of same to open the valve thus defeating the leaving of the valve in open position unless the pilot flame 125 is burning.

To serve a purpose similar to that of thermostat 130 of Figs. 14 and 15 for acting upon the mechanism of Figs. 17 to 20 inclusive, I may substitute a different thermodynamic element consisting of a sylphon or fluid tight bellows 180 mounted at its bottom end upon the shelf portion of frame plate 32 through which runs a preferably flexible conduit 181 also fluid tight and in fluid tight communication with the bellows 180 but sealed at its remote end 182 designed to be put in the zone of heat of the pilot flame. This may be accomplished by coiling the remote terminus of conduit 181 as shown in Fig. 21 and substituting it for the thermostat 130 of Fig. 15 or same for example may be wound about the pipe 183 which conducts gas to the pilot burner 184 which latter in Fig. 16 is shown just inside the wall of oven compartment, the coil of the conduit being closely adjacent but preferably just outside said wall or otherwise removed from heat zone of oven 112 while sensitive to the heat zone of the pilot flame 125 the burning of which warms pipe 183. It will be clear that the thermo-dynamic devices and connecting cables or conduits of Figs. 15 and 16 are interchangeable and that either are equally usable in application to Fig. 3 or Fig. 17. Were the wire 137 of Fig. 15 to operate lever 162 of Fig. 17, it would, of course, be connected to pull down at the left of pivot 165 to hold pin 164 upwardly and out of interference with trip projection 160 so long as the thermostat 130 is hot. The bellows 180 is seen to perform an equivalent function by pushing upwardly through means of fork 185 acting on pin 186 so long as the remote end 182 of conduit 181 is hot and the fluid contained therein expanded.

In Figs. 5 and 6 a modification is shown whereby if the valve is open handle 62 can be turned only a quarter turn rather than a half turn so that under these conditions the valve can be cocked for only one time controlled movement, viz. to close the valve. This, in a measure, is a factor of safety insuring the turning off of the gas to be the last operation which the timing mechanism can be set to perform and is accomplished simply by the following mechanism. In Figs. 5 and 6 the connection between crank 30 and valve stem 17, although not a necessary factor in this modification, is shown as a simple bowed leaf-spring 165 hinged at the top to crank 30 and at the bottom to valve stem 17 and the normal curvature of which is midway between the full line and dotted line shapes of spring 165 in Fig. 5 so that the uppermost position in said Figure opens the valve through a straightening pull on said spring and the lowermost position closes the valve through a bowed deflection in said spring. The safety interlocking means comprise a horizontal key 166 fixed to and traveling up and down with valve stem 17 as guided in a vertical slot 167 in the middle frame plate 31. Shaft 39 extends backward of said frame plate and carries fixed thereto a two-toothed wheel 168 so rotatively positioned on shaft 39 that in the uppermost or valve open position of key 166 handle 62 is blocked by said key against more than a quarter turn unless arm 47 is free to pass rocker 71 thereby precluding more than a quarter turn of arm 47 under time control from position 47d. Of course if arm 47 is free to travel with handle 62 as in ordinary hand actuation of the valve without time control, key 166 is lowered out of operative interference with wheel 168 and no interlocking occurs.

Fig. 7 shows a suitable shape that may be given to detent wheel 41 when it is desired to prevent retrogressive movement of handle 62 and in that figure the various positions of roller 42 with the pivot on which it swings are diagrammatically illustrated to show the action of roller 42 at all times urging detent wheel 41 into such position that roller 42 may seat fully in the crotch of said wheel yet precluding counter-clockwise movement of said wheel because of the inability of roller 42 passing to the opposite side of dead center, or of a line passing through pivot 45 and the center of detent wheel 41. To further insure this it is desirable to provide lever 44 with a positive stop against further swinging to the right when fully seated in detent wheel 41 such as in the construction of Figs. 1 and 2 is afforded by the cutaway portion of middle frame plate 31.

I may however by varying the position of pivot 45 to some such location as indicated at 45' in Fig. 7 and in Fig. 4, and further if desired by varying the shape of the detent wheel 41', condition the latter to be definitely though yieldingly positioned by roller 42' as regards the travel of detent wheel 41' in either direction of rotation. Such arrangement is shown in Fig. 4 where handle 62 may be swung reciprocatively quarter turns instead of constantly advanced in the same direction to open and close the valve and from its position extending to the right in Fig. 4 a half turn to its full line position will cock the valve for two escapements at predetermined times if the time pointers have previously been set to lock rollers 70 and 71. But here, inasmuch as roller 42 is not designed to prevent retrogressive movement of handle 62, I may provide a frictionally pivoted catch 170 on the outside of the casing shiftable to and from a position to engage with and hold an extension 171 on lever 44' which is normally but yieldingly urged by spring 172 in a direction pressing roller 42 into engagement with detent wheel 41'. And, likewise, if the timing mechanism is locked when handle 62 points downwardly in Fig. 4, a quarter turn of said handle to its full line position where it may be retained by the locking action of catch 170 will cock the valve for a single automatic action to closed position under time control.

Many modifications will occur to mechanics skilled in this art, as for instance that the cocking or tensioning of the valve may be accomplished in Figs. 1 and 2 as well as in Fig. 4 by a separate spring impelled actuator distinct from but establishable in operative relation to the manual handle 62, and bearing for example a similar mechanical relation to handle 62 as does the cocking handle numbered 20 to the valve handle 63 in my U. S. Patent Reissue No. 15,044. In this arrangement the valve may be manually opened and closed after being cocked or tensioned for time controlled action without upsetting or interfering with the set condition of the time mechanism.

It will further be appreciated that band spring 51 is susceptible of permitting a considerable amount of "winding up" so that if pin 46 be removed from shaft 39 in Fig. 1 and Fig. 2, handle 62 may be turned and held a considerable number of turns in advance of stop arm 47, in which case if a suitable timing mechanism be employed to rotate cams 78 and 79 continuously, (as distinguished from the time returned feature of operation which characterizes so called interval timers) then rockers 70 and 71 will be alternately released upon each complete revolution of said cams so that the mechanism so arranged could be wound and conditioned to perform any desired number of repeated opening and closing of the valve at regular intervals of time after one setting.

I may accomplish many of the objects of the present invention by the simple substitution of the valve 10 and operating gears 53 and 54 herein for the porcelain base 82 and electrical contacts 85 of the disclosure in my co-pending application Serial No. 642,946. In this case gear 53 of the present disclosure will replace the movable contact structure 84 of the application referred to and the valve will be caused to open and close at all times with a snap movement as do the contacts 85 of the co-pending application. Present spring 51 will serve the function of spring 89 of the co-pending application.

Attention is called to the wording marked on the casing in Fig. 4, whereby the handle 62 may by its position registering with the words "off" and "on" indicate the position to which the valve will ultimately be moved under time control in place of employing the words shown in italics as carried by the indicator 65 in Figs. 8 to 13 inclusive. Thereby, in window 66 would occur only the words on indicator 64 showing only the true position of the valve.

I may substitute an electric switch or other flow control device for the valve 10 of this disclosure and may employ and intend in the following claims to define many combinations of mechanisms and principles that may be resorted to for obtaining the advantages of the invention herein described.

It should be pointed out that an arrangement of apparatus such as pictured in Figs. 14 and 16 need not of necessity involve the time controlled valve 10 being ahead of the heat controlled valve 115 in the supply line to burner 111 as their relative position in this respect might be reversed, nor is it pertinent at what point in the supply line 114 connection be made to tap off a supply of gas for the pilot flame 125 and such point may bear any other possible relations to the positions of valve 10 and valve 115 in the supply line.

The safety pilot devices of Figs. 15, 16 and 21, including that of Fig. 17, are equally usable in combination with the safety mechanisms disclosed in Figs. 1, 2, and 26 of my co-pending application Serial No. 150,278.

Whereas the method of automatic control of a cooking oven by the apparatus hereinbefore described and pictured in Fig. 14 may appropriately be termed "sustained cooking" for the reason that the cooking is started by timing mechanism and later stopped by timing mechanism and in the intervening period automatically maintained within predetermined set limits of cooking temperature as governed by the thermostat 117, the apparatus here disclosed is equally usable by a modified operation of the mechanism 116 and 119 through which thermostat 117 acts upon valve 113 to effect a method of automatically controlled cooking wherein the time controlled valve 10 serves the mere function of starting the cooking at a predetermined time and wherein thermostat 117 acts only to reduce or shut off the supply of gas upon the attainment of a determinate temperature in oven 110 and upon the consequent cooling of said oven does not act to again increase or open the supply of gas.

I claim:

1. Flow control means including a flow conditioning element controllable by timing mechanism and embodying in combination, means to tension said element for automatic movement, an actuator for manually operating said element, means acting upon said actuator in definite positions thereof to oppose progressive and retrogressive movement of said actuator from said positions, and a detent time controlled to retain and release said element for automatic movement.

2. Flow control means including a flow conditioning element controllable by timing mechanism and embodying in combination, means to tension said element for reciprocative movement between open and closed positions, an actuator arranged for uni-directional movement for manually operating said element, means acting upon said actuator in definite successive positions thereof to oppose progressive and retrogressive movement of said actuator from said positions and conditionable by said actuator to permit said progressive movement, and a detent time controlled to retain and release said element for movement.

3. Flow control means including a flow conditioning element controllable by timing mechanism and embodying in combination, means to tension said element for automatic movement, a handle for manually actuating said element, a detent time controlled to retain and release said element for movement, and means to bias said handle into fixed, spaced stations for definitely positioning said element.

4. Flow control means including a flow conditioning element controllable by timing mechanism and embodying in combination, means to tension said element for automatic movement, a handle for manually actuating said element, a detent time controlled to retain and release said element for movement, and means to bias said handle into fixed, spaced stations for definitely positioning said element, and arranged to prevent retrogressive movement of said handle between said stations.

5. Mechanism for effecting successive flow controlling movements of a flow conditioning element embodying, ultimate means connected to move said element, transmitting means connected to move said ultimate means, manual means connected to actuate said transmitting means, and a detent device co-operating with one of said means to establish definite stations of rest and arranged for urging said means both forward and backward to restore it to one of said stations of rest, if said means is displaced therefrom.

6. Mechanism for effecting reciprocative flow controlling movements of a flow conditioning element and embodying ultimate means connected to effect reciprocative movement of said element by successive stages of uni-directional movement, transmitting means connected to move said ultimate means, manual means connected to actuate said transmitting means, and a detent device co-operating with one of said means to establish definite stations of rest for said means and thereby for said element substantially at the ends of its reciprocative travel and arranged for urging said means both forward and backward to restore it to one of said stations of rest, if said means is displaced therefrom.

7. Mechanism for effecting successive flow controlling movements of a flow conditioning element and embodying, transmitting means connected to move said element, manual means for actuating said transmitting means, resilient connection between said manual means and said transmitting means whereby the former may tension the latter for automatic movement, and a detent device co-operating with one of said means to establish definite stations of rest for said element and normally acting to urge said means to impel said element into one of said stations of rest, together with an automatic control conditionable at one time to prevent and at another time to permit movement of said transmitting means responsive to said manual means.

8. Mechanism for effecting successive flow controlling movements of a flow conditioning element and embodying, transmitting means connected to move said element, manual means for actuating said transmitting means, resilient connection between said manual means and said transmitting means, and a detent device co-operating with one of said means to establish definite stations of rest for said element and normally acting to urge said means to impel said element into some one of said stations of rest, and an automatic control conditionable to prevent and to permit movement of said transmitting means responsive to said manual means, together with a safety stop device also conditionable to prevent and to permit said movement of said transmitting means.

9. Mechanism for actuating a slidable flow conditioning element embodying, a crank connected so that alternate half turns thereof cause said element to slide in respectively opposite directions, a transmitting rotor including a stop arm and intergeared with said crank, manual means pivoted co-axially with said rotor and having both positive drive engagement with said rotor and also resilient connection thereto for tensioning said rotor when relatively displaced therefrom, and an automatically controlled stop to engage with and hold said stop arm, together with a detent arranged to catch and hold said manual means relatively displaced from said rotor for tensioning the latter for automatic stop controlled movement, said detent further acting to establish a plurality of stations constituting normal positions for said manual means.

10. In time controlling mechanism, a yieldable detent, a timer to block the yielding of said detent, and a controlled device movable in a path to be intercepted by said detent and formed in its portion which engages with said detent to urge said detent out of its path of travel for passing in both directions when said detent is free to yield.

11. In actuating mechanism for a flow control device, an actuator for moving said device, a disconnectable coupling arranged to transmit movement from said actuator to said device, resilient means for causing automatic movement of said device without corresponding movement of said actuator when said coupling is disconnected, and an automatic trip conditionable at one time to leave said coupling undisturbed and at another time to disconnect said coupling.

12. In combination with the mechanism of claim 11 means to restore the coupled connection of the actuator and the device consequent upon movement of said actuator after said coupling has been disconnected.

13. Mechanism for reciprocating a slidable flow governing member embodying a crank, a connecting rod and associated means for transmitting a non-positive resilient thrust to said member by the rotation of said crank whereby the driving torque existant in said crank possesses its greatest leverage upon said resilient means at the extreme positions of travel of said slidable member, together with a detent, spring urged and co-operating with said crank to impel and station the same to dead center position relative to said connecting rod and with sufficient force automatically to overcome the resilient counter thrust transmitted to said crank by said sliding member.

14. In combination, an ultimate operator, a manual means for moving the same in one direction, yielding means for moving said operator in the same direction and connections between said operator, manual means and yielding means constructed and arranged to permit the manual means to be set in a fully advanced position or in a position of intermediate advance with respect to its normal relation to said operator, said operator being later and automatically moved in two selective stages of follow up movement relative to said manual means under the impulse of said yielding means, whereby the said mechanism may be utilized for automatically effecting either of two movements predetermined by the user at the time of setting said manual means.

15. In spring actuated mechanism, in combination, a follow-up controlled device, manual means for actuating the same, a resilient connection between said device and said manual means, a star wheel turning with said manual means, and a detent lever with means to urge same into engagement with said star wheel said lever being yieldable for the twofold purpose of permitting movement of said manual means for operating said device and for absorbing the impact of said device when it strikes said manual means in its follow-up movement relative thereto.

16. A step-by-step snap actuating mechanism including in combination, a manual for exerting an actuating power, a follower to be actuated by said power, means for storing said power between the time said manual starts to move and the time said follower starts to move, a multi-stage detent mechanism arranged to determine different stations of rest for said actuator, and another detent arranged to determine a station of rest for said follower and to oppose said power when exerted upon said follower through said means.

17. A step-by-step snap actuating mechanism including in combination, a manual for exerting an actuating power, a follower to be actuated by said power, means for storing said power between the time said manual starts to move and the time said follower starts to move, a multi-stage detent mechanism arranged to determine different stations of rest in common for said actuator and for said follower and separate detent means arranged to determine a station of rest for said follower independently of the first said detent mechanism.

18. Mechanism for producing after a time lag, a quick follow-up movement of a handle actuated device and including in combination, the actuated device, manual operating means, a handle to station said manual means in a plurality of selective absolute positions, and means to detain said device in a plurality of selective positions relative to said manual means while the manual means remains in a single one of its said absolute positions.

19. Mechanism for producing after a time lag a quick follow-up movement of a handle actuated device including in combination, the actuated device, manual operating means, a handle to rotate said manual means into a plurality of selected progressive positions, and means to detain said device in arrear of said manual means in a plurality of selected rotative positions relative to said manual means while said manual means remains in a single one of its said progressive positions.

20. Mechanism for producing after a time lag a quick follow-up movement of a handle actuated device including in combination, the actuated device, manual operating means, a handle to station said manual means in a plurality of rotative positions spaced from one another less than 180-degrees of travel, and means to detain said device in a plurality of selective positions relative to said manual means while said manual means remains in a single one of its said positions.

21. Mechanism for producing after a time lag, a quick follow-up movement of a handle actuated device and including in combination, the actuated device, manual operating means, a handle to station said manual means in a plurality of selective absolute positions, means to detain said device in a plurality of selective positions relative to said manual means while the manual means remains in a single one of its said absolute positions, means connecting said device with said manual means for storing power for operating said device, and a time controlled detent arranged to cause the time lag between the movements of said manual means and of said device and to predetermine the duration of said lag.

22. In a timing mechanism, the combination with a device arranged always to advance in the same direction and whose successive automatic movements in the said direction from one to another of a plurality of stations of rest is to be timed, of time controlled detents arranged respectively to govern the successive movements of said device between its said stations of rest and means to insure that the final automatic movement of said device shall be to a definite one of its said stations of rest.

23. In a timing mechanism, the combination with a device arranged always to advance in the same direction and whose successive automatic movements in said direction from one to another of a plurality of stations of rest is to be timed, of time controlled detents arranged respectively to govern the successive movements of said device between its said stations of rest and means to prevent the final automatic movement of said device from leaving said device in certain of its said stations of rest.

24. In mechanism for timing a controlled device, in combination with the said device, a manual actuator for imparting movement to said device, means acting constantly to bias said actuator to some one of a plurality of positions, an arrestor movable with said device, means operative at one time to intercept and at another time not to intercept said arrestor in its movement responsive to movement of said actuator, means whereby movement of said actuator while said arrestor is intercepted conditions the latter for a later automatic action.

25. In mechanism for timing a controlled device, in combination with the said device, a manual actuator for imparting movement to the said device, means acting constantly to bias said actuator to some one of a plurality of positions, an arrestor movable with said device, means operative at one time to intercept and at another time not to intercept said arrestor in its movement responsive to movement of said actuator, and means whereby movement of said actuator tends to impel said arrestor for imparting movement to said device and whereby said actuator can move without said arrestor while the latter is intercepted thereby to condition the arrestor for later automatic action.

26. In combination with mechanism for timing the flow of a combustible fuel, automatic operating mechanism, detent means controlled by said timing mechanism to at one time retain and at another time release said mechanism for automatic action, and heat sensitive safety lock means operative to defeat the automatic action of said operating mechanism and including a pilot flame for igniting the fuel.

27. In combination, a controlled device arranged for limited movement, a source of power arranged to push and pull on said device, springs arranged to transmit the push and pull of said source of power to said device, means acting normally to limit the full action of one of said springs upon said device, and safety means to liberate the said one of said springs for performing its full action upon the controlled device.

28. In timing mechanism, a device whose movement is to be timed, a time controlled means for transmitting movement to said device, a resilient connection tending to urge said device to a definite position, and a trippable connection between said device and said movement transmitting means, and a safety control adapted under predetermined conditions to become operative upon said trippable connection thereby to deliver said device from the power of said movement into the power of said resilient connection.

29. In combination, a controlled device arranged for reciprocal limited travel, a crank powered to rotate by stages of half-turn movement, a link structure connecting said device and said crank and composed of relatively movable parts, means to lock parts of said link structure against relative movement, and a safety control for unlocking said parts, and a resilient connection arranged to cause relative movement of said link parts when said means are unlocked, thereby to cause automatic movement of said controlled device without corresponding movement of said crank.

30. Mechanism for operating a reciprocatory flow governing member, embodying in combination, a crank for delivering power, a rigid pitman, an element constrained for sliding movement in unison with said flow governing member, and yielding means for transmitting the power of said rigid pitman to said sliding element, said crank and pitman exerting force upon said yielding means in variable angular relationships as the crank rotates and exerting a maximum force thereupon when said crank, pitman and sliding element are aligned in dead center relationship at either extreme of the travel of said flow governing member.

31. In combination, a controlled device arranged for reciprocal limited travel, a crank powered to rotate by stages of half-turn movement, a link structure serving as a flexible pitman and connecting said device and said crank and composed of parts which are relatively hinged and relatively slidable, means to lock parts of said link structure against their relative sliding movement, and a safety control for unlocking said parts.

32. In combination, mechanism for moving a flow conditioning element embodying an ultimate actuator immediately connected to said element, an operating handle, transmitting gears connecting said handle to said actuator and of such ratio that said actuator performs a faster movement than said handle thereby repeating its cycle of movement more often than said handle repeats its cycle of movement, and a detent device acting on said mechanism simultaneously to detain said element and said handle in designed stations of rest, said handle possessing more different stations of rest than does said element and actuator because of the said ratio of said transmitting gears.

Signed at New York city this 28th day of December 1926.

RAYMOND D. SMITH.